2,569,339

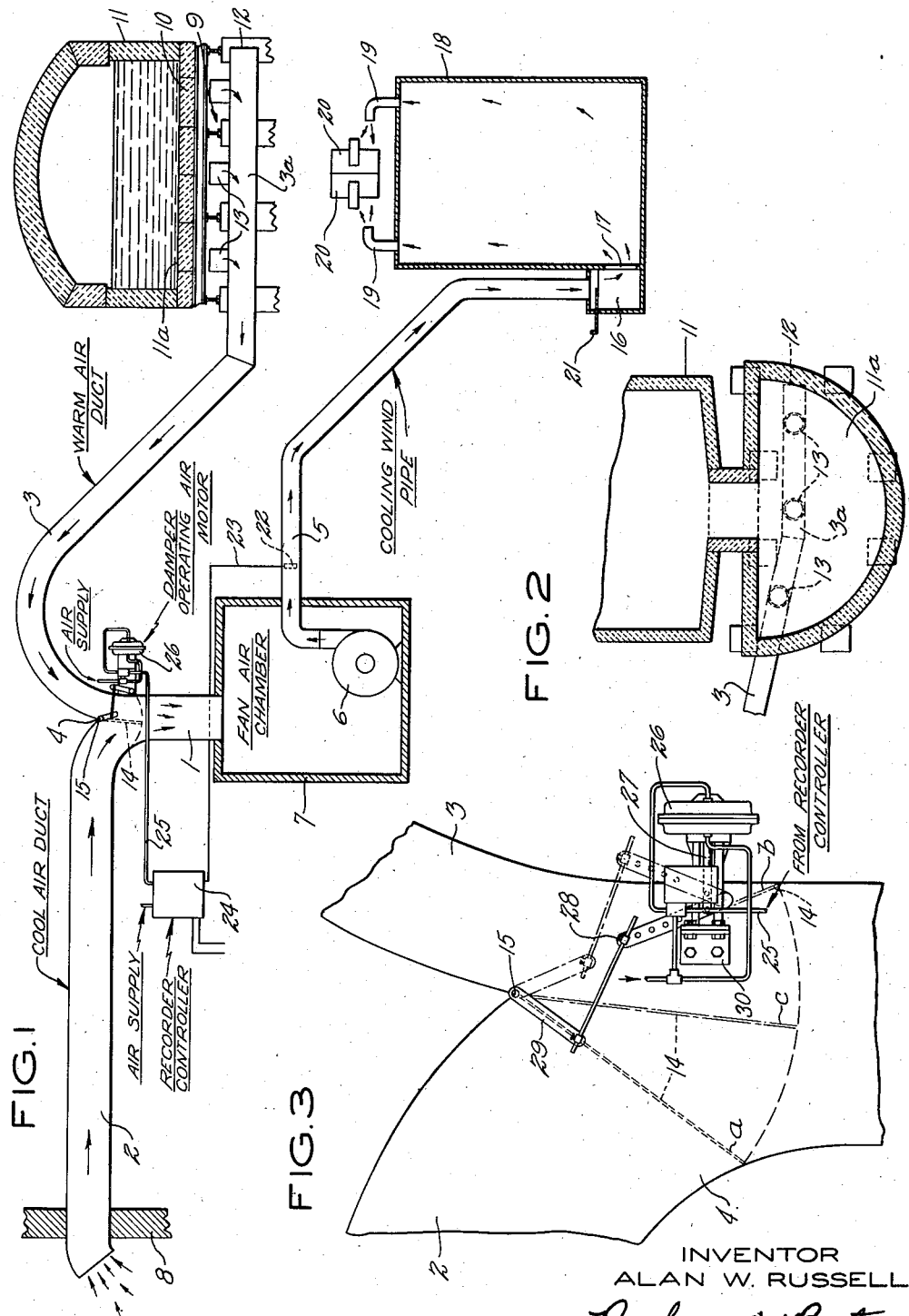
Sept. 25, 1951    A. W. RUSSELL    2,569,339
COOLING WIND SYSTEM FOR GLASSMAKING EQUIPMENT
Filed Dec. 21, 1949
INVENTOR
ALAN W. RUSSELL
BY Parham & Bates
ATTORNEYS Patented Sept. 25, 1951

UNITED STATES PATENT OFFICE 2,569,339

COOLING WIND SYSTEM FOR GLASS-MAKING EQUIPMENT

Alan W. Russell, Wethersfield, Conn., assignor to Emhart Manufacturing Company, a corporation of Delaware Application December 21, 1949, Serial No. 134,202

2 Claims. (Cl. 49—40)

Large amounts of cooling air, usually termed "cooling wind," are used in glass plants to cool elements of glassware forming machine assemblies, particularly molds, dead plates for glassware and glassware conveyors. This cooling air is customarily discharged at low pressure against the equipment to be cooled, as under pressure resulting from the operation of a blower fan, and usually is drawn from the atmosphere outside of the glassmaking plant or at least outside of the factory room where it is to be used. The amounts of cooling wind required necessitate procurement of an adequate supply and handling thereof at a low unit cost.

The temperature of the cooling wind customarily used in glassmaking plants necessarily is affected by changes of temperature of the atmospheric air supply. These occur naturally during each period of twenty-four hours and as the seasons change and as a result of storms, changes of direction of winds, etc. Such temperature changes are substantial and at times have seriously interfered with efficient glassmaking operations. Glass forming molds, for example, perform their intended functions best when kept at a predetermined constant temperature.

An object of the present invention is to provide cooling wind for glassware forming machine molds and associate elements at a substantially constant predetermined temperature irrespective of changes of temperature of the outside atmospheric air resulting from natural or other causes.

A more specific object of the invention is to provide a relatively simple but efficient and reliable system to provide cooling wind for glassware forming machine molds and associate elements at a low cost and at a temperature which is automatically maintained substantially constant at a predetermined set point.

According to the invention, warm air from a source in the usual glassmaking plant is mixed with cooler air drawn from the atmosphere outside the plant to provide as an end product cooling wind for cooling molds and other glassware forming machine parts and adjuncts and the ratio of these components is regulably controlled by means responsive to the temperature of the cooling wind so that it will have a substantially constant predetermined temperature. The source of the warmer, inside air component of the cooling wind may be space beneath a glass melting tank furnace. In some glass plants, such source may be a heated air space next to an annealing furnace or other space containing an adequate supply of air warmer than room temperature.

The invention provides automatic control means responsive to the measured temperature of the cooling wind to regulably control the proportioning of the relative amounts of the warmer inside air component and the cooler outside air component to provide cooling wind having a predetermined desirable temperature which is maintained substantially constant. This results in stabilization of the operation of glass forming machine parts and adjuncts to which the cooling wind is applied and which are adversely affected by temperature changes from predetermined optimum temperature conditions.

Other objects and advantages of the invention will hereinafter be pointed out or will become apparent from the following description of a practical embodiment of the invention as shown in the accompanying drawings, in which Figure 1 is a more or less diagrammatical and partly sectional view of an assembly of structural parts and control mechanisms combined to provide an example of the novel cooling wind system;

Fig. 2 is a plan view of a horizontal section of a portion of a glass melting tank furnace and associated warm air intake duct extending therebeneath as in Fig. 1; and Fig. 3 is a relatively enlarged view of a fragmentary part of the air duct structure of the novel system, having a proportioning damper therein and provided with an associated operating means for the damper.

Referring more particularly to Fig. 1, a cooling wind pipe according to the present invention comprises a main intake duct 1 having a cool air branch 2 and a warm air branch 3. These two branches are joined in a conventional manner to the main intake duct 1, as by a generally Y-shaped pipe joint connection 4. The wind pipe also comprises a delivery portion, indicated at 5.

The function of the intake duct portion of the wind pipe is to conduct an adequate amount of air to a blower fan 6 which is operatively connected to one end of the delivery portion 5 of the wind pipe so as to blow the cooling wind therethrough. The intake duct might of course be directly connected to the fan. In the example shown and as is preferred by me, it is arranged to discharge air into a closed fan air chamber, designated 7, in which the fan 6 is disposed. The delivery portion 5 of the wind pipe extends through a wall of the chamber 7. Any suitable known blower fan or air blowing equipment may be used.

The cool air branch intake duct 2 is shown as extending through a wall 8 which may represent an outer wall of the glass plant. Outside atmospheric air thus may enter the outer end of this branch 2 as shown in Fig. 1. The temperature of this relatively cool air will vary within a wide range according to the time of day, season, climatic condition, etc.

The warm air branch intake duct 3 is shown as having a terminal portion 3a, Figs. 1 and 2, disposed transversely across a space, designated 9, beneath the floor 10 of a portion 11a of a glass melting tank furnace 11. The furnace 11 will maintain the air in the space 9 therebeneath at a temperature which is always higher than room temperature even though it may vary as the temperature of the surrounding air varies. The terminal portion 3a of the intake duct branch 3 may be closed at its extremity 12 and provided with a plurality of spaced upturned open inlets 13 on its upper side. In the example shown, the intake branch duct 3 conducts air from a space beneath the nose or refining portion 11a of the tank furnace but the exact location of the warm air space beneath a furnace or elsewhere in a glass plant may be different for different installations or places of use.

A proportioning damper, designated 14, is pivotally mounted by a pivot shaft 15 in the Y-shaped pipe joint connection 4 of the intake duct and by its position in such connection will regulate the relative amounts of cool air and warm air permitted to pass from the branches 2 and 3, respectively, to the main intake duct 1. In Fig. 3, one extreme position of the damper by which the cool air supply to the main duct is shut off is indicated at a. In another extreme position b of the damper, the warm air supply is shut off from the intake duct 1. An intermediate position c of the damper will allow approximately equal flow of air from the two branch ducts into the main intake duct. A mechanism for adjusting the position of the damper according to the temperature of the air in the delivery portion of the wind pipe will hereinafter be pointed out.

The delivery portion 5 of the cooling wind pipe obviously may extend to a place at which cooling wind is to be discharged or may be divided into branches leading to the places where cooling wind is to be applied. In the example shown in the drawings, the delivery portion of the wind pipe discharges air to an inlet chamber 16 from which such air passes through a port 17 into the lower part of a cooling wind distribution chamber 18. Discharge nozzles 19 are shown as operatively connected with the top of the cooling wind chamber 18 so as to discharge cooling wind onto the mold halves 20. A damper 21 is provided in the inlet chamber 16 to regulate flow of cooling wind therethrough into the cooling wind chamber 18.

Various assemblies of known elements may be used to position the proportioning damper according to the temperature of the cooling wind to provide cooling wind of a desired predetermined temperature at any given time and to adjust the position of the proportioning damper to maintain this temperature. One such assembly is shown more or less diagrammatically in the drawings and comprises a conventional distant reading bulb type thermometer 22, operatively positioned in the delivery portion 5 of the cooling wind pipe and having an operative connection, indicated at 23, with a conventional pneumatic type recorder controller 24 which in turn is operatively connected by an operating air tube 25 with one side of a springless type diaphragm motor 26. The diaphragm motor 26 includes a longitudinally driven operating stem or rod 27 adjustably and operatively connected by a suitable known lever-and-linkage assembly, generally designated 28, with an external adjusting handle or lever 29 for swinging the proportioning damper 14 about the axis of the supporting pivot rod 15. The diaphragm motor 26 is mounted in a fixed position, as on a bracket 30, conveniently although not necessarily attached to the wind pipe near the junction of the intake branches 2 and 3. The recorder controller will actuate the diaphragm motor to position the proportioning damper appropriately for the temperature to which the instrument 24 is set so long as the temperature of the cooling wind at the temperature measuring point where the thermometer 22 is located stays approximately at that temperature and to swing the proportioning damper 14 to the left or to the right as viewed in Figs. 1 and 3 as required to place the proportioning damper in a new position appropriate to restore the predetermined temperature when a departure therefrom has been measured by the thermometer 22. Such a departure will be caused by a change of temperature of the cool air component introduced into the system from the outside atmosphere through the branch 2. Let it be assumed by way of example that the controller 24 is set for 70° wind temperature and the maximum temperature of the outside air is about 65° F. and the temperature of the warm air drawn from under the furnace is about 130° F. The control mechanism as described would automatically maintain the proportioning damper at a position near the right-hand position b of Fig. 3 during the hottest part of the day so that the fan would be using about 95% of the cooler component from outside the factory. As the outside air cooled during the night or from a weather change, the proportioning damper would be moved to the left to admit a larger percentage of warm air to keep the cooling wind temperature at about 70°. Thus, as the outside temperature went down to about 40°, the damper would be moved to the left from the position b to a position such that approximately ⅓ of the total air passing to the fan would be supplied by the warm air branch intake duct.

If desired, known expedients, such as limit switches, may be associated with the proportioning damper to stop its swing at either of its limits before it has been thrown violently against the adjacent portion of the wall of the cooling wind pipe structure.

The exact location of the thermometer in the cooling wind system may be varied as occasion may permit or require and obviously may be nearer than shown to the place of actual discharge of cooling wind.

The details of the structure embodying the cooling wind system of the present invention as illustrated in the accompanying drawings and herein particularly described obviously may be changed in numerous ways which now will be obvious to those skilled in the art and I, therefore, do not wish to be limited to such details.

I claim:

1. A cooling wind system for glassmaking equipment in a glass plant comprising a glass melting tank furnace in said plant provided with a space therebeneath containing air heated by the furnace structure to a temperature above normal room temperature, a glassware mold in said plant and to be cooled, a main air intake duct having a branch positioned to receive relatively warm air from said space beneath said furnace and a cool air branch positioned to receive cool air from the atmosphere outside the plant, means to proportion the relative amounts of the relatively warm air and cool air passing from the respective branches to said main air intake duct, a wind delivery pipe having a wind discharge outlet located in operative relation to said mold, means to blow the air supplied by said main intake duct into and through said wind delivery pipe, and automatically acting means responsive to the temperature of the air blown through said delivery pipe to regulably control the means to proportion relative amounts of relatively warm air and cool air passing to the main intake duct to maintain a substantially constant predetermined temperature in the air blown through the delivery pipe.

2. A cooling wind system for glassmaking equipment in a glass plant comprising a glass melting tank furnace in said plant having a warm air space therebeneath, a glassmaking element in said plant and to be cooled, an air intake duct arranged to receive relatively warm air from said warm air space, a second air intake duct arranged to receive cooler air from the atmosphere outside the plant, cooling wind conducting and discharge means common to both said intake ducts and operatively connected therewith to receive air therefrom and to discharge cooling wind against said glassmaking element, and means to proportion the relative amounts of relatively warm air and cooler air supplied by the respective intake ducts to said cooling wind conducting and discharge means to predetermine the temperature of the cooling wind in the latter, said proportioning means being constructed and arranged to be responsive to departures of temperature of said cooling wind from a predetermined set temperature to alter the relative amounts of relatively warm air and cooler air forming said wind to restore said predetermined temperature thereof.

ALAN W. RUSSELL.

REFERENCES CITED

The following references are of record in the file of this patent:

UNITED STATES PATENTS

| Number | Name | Date |
|---|---|---|
| 1,022,188 | Geissinger | Apr. 2, 1912 |
| 1,633,028 | La France | June 21, 1927 |
| 2,266,217 | Kingsland | Dec. 16, 1941 |
| 2,440,052 | Lingen et al. | Apr. 20, 1948 |

FOREIGN PATENTS

| Number | Country | Date |
|---|---|---|
| 485,370 | Great Britain | May 16, 1938 |